(12) United States Patent
Jin et al.

(10) Patent No.: US 11,992,860 B2
(45) Date of Patent: May 28, 2024

(54) AIR LAYER FOR IMPROVED PERFORMANCE OF TRANSDUCER AT LOW FREQUENCIES

(71) Applicant: Halliburton Energy Services, Inc., Houston, TX (US)

(72) Inventors: Jing Jin, Singapore (SG); Ruijia Wang, Singapore (SG); Xiang Wu, Singapore (SG)

(73) Assignee: Halliburton Energy Services, Inc., Houston, TX (US)

(*) Notice: Subject to any disclaimer, the term of this patent is extended or adjusted under 35 U.S.C. 154(b) by 492 days.

(21) Appl. No.: 17/346,715

(22) Filed: Jun. 14, 2021

(65) Prior Publication Data

US 2022/0395860 A1 Dec. 15, 2022

(51) Int. Cl.
*B06B 1/06* (2006.01)
*G01V 1/02* (2006.01)
*G01V 1/52* (2006.01)

(52) U.S. Cl.
CPC .......... *B06B 1/0603* (2013.01); *B06B 1/0614* (2013.01); *G01V 1/159* (2013.01); *G01V 1/52* (2013.01); *B06B 2201/73* (2013.01); *G01V 2001/526* (2013.01)

(58) Field of Classification Search
CPC ................. B06B 1/06; B06B 1/0603
USPC ......................... 310/322, 334, 335
See application file for complete search history.

(56) References Cited

U.S. PATENT DOCUMENTS

| 4,782,910 A | 11/1988 | Sims |
| 5,197,041 A | 3/1993 | Balough |
| 2016/0288167 A1 | 10/2016 | Jin et al. |
| 2017/0212274 A1 | 7/2017 | Sun et al. |
| 2017/0276819 A1* | 9/2017 | Chang ............... B06B 1/0622 |
| 2017/0285205 A1 | 10/2017 | Jin et al. |
| 2017/0299751 A1 | 10/2017 | Chang et al. |
| 2018/0021815 A1 | 1/2018 | Jin et al. |
| 2019/0204468 A1 | 7/2019 | Ge et al. |
| 2019/0211672 A1 | 7/2019 | Jin et al. |
| 2019/0277994 A1 | 9/2019 | Palani et al. |
| 2020/0003924 A1 | 1/2020 | Jin et al. |

(Continued)

FOREIGN PATENT DOCUMENTS

| EP | 2696772 B1 | 5/2019 |
| JP | 2016-102773 A | 6/2016 |

OTHER PUBLICATIONS

International Search Report and Written Opinion for Application No. PCT/US2021/039659, dated Mar. 3, 2022.

*Primary Examiner* — Derek J Rosenau

(74) *Attorney, Agent, or Firm* — Benjamin Ford; C. Tumey Law Group PLLC

(57) ABSTRACT

A Transducer in a downhole environment with an increased amplitude of the transducer output at lower frequencies. A transducer may include a bender bar, wherein the bender bar may include a first piezoelectric layer disposed on one surface of the bender bar, a second piezoelectric layer disposed on the opposite surface of the bender bar, and a metallic substrate disposed between the first piezoelectric layer and the second piezoelectric layer. The transducer may further include a first fixed end is attached to the bender bar and connects the bender bar to a base, a second fixed end opposite the first fixed end that attaches the bender bar to the base, and a compartment disposed within the base.

20 Claims, 11 Drawing Sheets

(56) References Cited

U.S. PATENT DOCUMENTS

2021/0103069 A1    4/2021    Jin et al.
2021/0141115 A1    5/2021    Wang et al.

\* cited by examiner

AIR LAYER FOR IMPROVED PERFORMANCE OF TRANSDUCER AT LOW FREQUENCIES

BACKGROUND

Wellbores drilled into subterranean formations may enable recovery of desirable fluids (e.g., hydrocarbons) using any number of different techniques. Acquiring properties of subterranean formations may enhance the recovery of desirable fluids. Identifying formation properties may be performed by many different systems and methods. One such system and method may capture formation properties by utilizing pressure pulses. Pressure pulses, which may also be referred to as acoustic waves, reflect off different parts of a formation or wellbore. The reflected pressure pulses may form secondary pressure pulses or secondary acoustic waves. In examples, these secondary pressure pulses may be shear velocity waves. Shear velocity waves may yields provide information on formation properties. The ability to create specific types of pressure waves may allow for different types of information of formation properties to be determined.

Transducers are a specific device that may be utilized to create different types of pressure waves. Transducers may induce pressure pulses in a forward and rear direction relative to a bender bar that is housed in the transducer. The bender bar is the mechanical device that physical creates the pressure pulses. As discussed below, transducers may create pressure pulses in a wide range of frequencies. Low frequencies, which may range between 1 to 5 kHz, may be of value as lower frequencies may create dipole and quadrupole waves. However, at low frequencies most of the rear waves pass through the metal structure of the transducer behind the bender bar and are not utilized to excite the formation. Thus, the amplitude of the transducer output at low frequency ranges is always less than at higher frequency range as rear pressure pulses travel in the opposite direction of investigation. This prevents extracting crucial acoustic properties of the formation, such as shear velocity.

BRIEF DESCRIPTION OF THE DRAWINGS

These drawings illustrate certain aspects of some examples of the present disclosure, and should not be used to limit or define the disclosure.

DETAILED DESCRIPTION

As discussed below, systems and methods are proposed to increase the amplitude of forward pressure pulses traveling in the direction of investigation from a transducer at lower frequencies. To increase the amplitude of the pressure pulses traveling in the direction of investigation from the transducer at lower frequencies a compartment within the transducer may be introduced. In effect, rear pressure pulses undergo a near total reflection when the pressure pulses contact the compartment. The reflected rear pressure pulses superimpose onto the front pressure pulses, which increases the amplitude of pressure pulses moving in the direction of investigation at lower frequencies. An increase in the amplitude of the pressure pulses traveling in the direction of investigation at lower frequencies leads to the extraction of formation properties.

Figure 1:
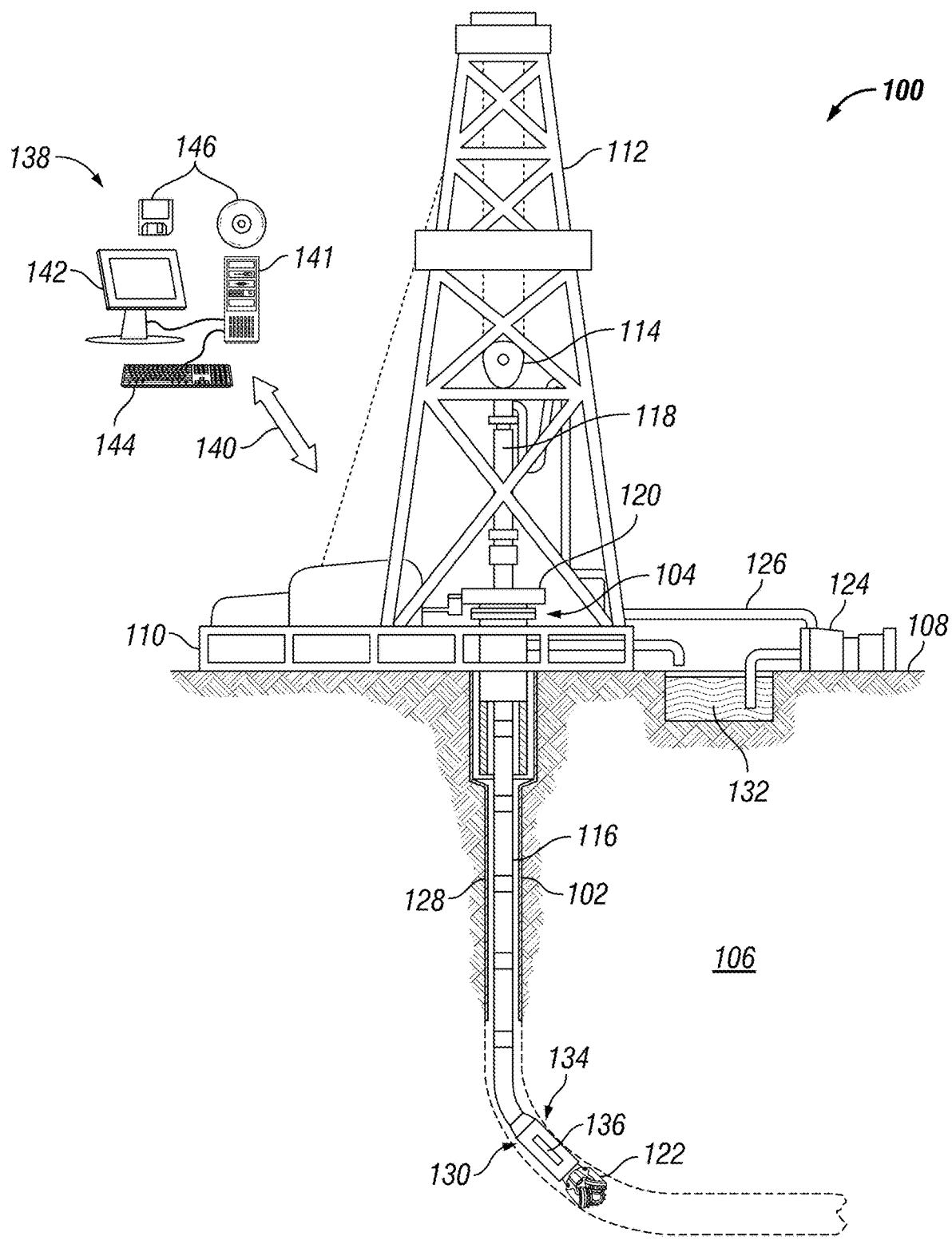
FIG. 1 illustrates an example of a drilling system.

FIG. 1 illustrates a drilling system 100. As illustrated, wellbore 102 may extend from a wellhead 104 into a subterranean formation 106 from a surface 108. Generally, wellbore 102 may include horizontal, vertical, slanted, curved, and other types of wellbore geometries and orientations. Wellbore 102 may be cased or uncased. In examples, wellbore 102 may include a metallic member. By way of example, the metallic member may be a casing, liner, tubing, or other elongated steel tubular disposed in wellbore 102.

As illustrated, wellbore 102 may extend through subterranean formation 106. As illustrated in FIG. 1, wellbore 102 may extend generally vertically into the subterranean formation 106, however wellbore 102 may extend at an angle through subterranean formation 106, such as horizontal and slanted wellbores. For example, although FIG. 1 illustrates a vertical or low inclination angle well, high inclination angle or horizontal placement of the well and equipment may be possible. It should further be noted that while FIG. 1 generally depict land-based operations, those skilled in the art may recognize that the principles described herein are equally applicable to subsea operations that employ floating or sea-based platforms and rigs, without departing from the scope of the disclosure.

As illustrated, a drilling platform 110 may support a derrick 112 having a traveling block 114 for raising and lowering drill string 116. Drill string 116 may include, but is not limited to, drill pipe and coiled tubing, as generally known to those skilled in the art. A kelly 118 may support drill string 116 as it may be lowered through a rotary table 120. A drill bit 122 may be attached to the distal end of drill string 116 and may be driven either by a downhole motor and/or via rotation of drill string 116 from surface 108. Without limitation, drill bit 122 may include, roller cone bits, PDC bits, natural diamond bits, any hole openers, reamers, coring bits, and the like. As drill bit 122 rotates, it may create and extend wellbore 102 that penetrates various subterranean formations 106. A pump 124 may circulate drilling fluid through a feed pipe 126 through kelly 118, downhole through interior of drill string 116, through orifices in drill bit 122, back to surface 108 via annulus 128 surrounding drill string 116, and into a retention pit 132.

With continued reference to FIG. 1, drill string 116 may begin at wellhead 104 and may traverse wellbore 102. Drill bit 122 may be attached to a distal end of drill string 116 and may be driven, for example, either by a downhole motor and/or via rotation of drill string 116 from surface 108. Drill bit 122 may be a part of bottom hole assembly (BHA) 130 at distal end of drill string 116. BHA 130 may further include tools for look-ahead resistivity applications. As will be appreciated by those of ordinary skill in the art, BHA 130 may be a measurement-while drilling (MWD) or logging-while-drilling (LWD) system.

BHA 130 may comprise any number of tools, transmitters, and/or receivers to perform downhole measurement operations. For example, as illustrated in FIG. 1, BHA 130 may include a measurement assembly 134. It should be noted that measurement assembly 134 may make up at least a part of BHA 130. Without limitation, any number of different measurement assemblies, communication assemblies, battery assemblies, and/or the like may form BHA 130 with measurement assembly 134. Additionally, measurement assembly 134 may form BHA 130 itself. In examples, measurement assembly 134 may comprise at least one transducer 136, which may be disposed at the surface of measurement assembly 134. Without limitation, transducer 136 may also be disposed within measurement assembly 134. Without limitation, there may be four transducers 136 that may be disposed ninety degrees from each other. However, it should be noted that there may be any number of transducers 136 disposed along BHA 130 at any degree from each other. Additionally, transducers 136 may be aligned on top of each other and spaced about the axis of BHA 130. Transducers 136 may function and operate to generate an acoustic pressure pulse that travels through wellbore fluids. In examples, transducers 136 may further sense and acquire the reflected pressure wave which is modulated (i.e., reflected as an echo) by the wellbore wall. In examples, measurement assembly 134 may also comprise at least one receiver 148, which may be disposed at the surface of measurement assembly 134. Without limitation, receiver 148 may also be disposed within measurement assembly 134. In examples, there may be four receivers 148 that may be disposed ninety degrees from each other. However, it should be noted that there may be any number of receivers 148 disposed along BHA 130 at any degree from each other. Additionally, receivers 148 may be aligned on top of each other and spaced about the axis of BHA 130. Receiver 148 may function and operate to receive an acoustic pressure pulse which may be referred to as an acoustic wave that travels through wellbore fluids.

During measurement operations, the travel time of the pulse wave from transmission to recording of the echo may be recorded. This information may lead to determining a radius of wellbore 102, which may be derived by the fluid sound speed. By analyzing the amplitude of the echo signal, the acoustic impedance may also be derived. Without limitation, transducers 136 may be made of piezo-ceramic crystals, or optionally magneto strictive materials or other materials that generate an acoustic pulse when activated electrically or otherwise. In examples, transducers 136 may also include backing materials and matching layers. It should be noted that transducers 136 and assemblies housing transducers 136 may be removable and replaceable, for example, in the event of damage or failure.

Without limitation, BHA 130 may be connected to and/or controlled by information handling system 138, which may be disposed on surface 108. Without limitation, information handling system 138 may be disposed downhole in BHA 130. Processing of information recorded may occur downhole and/or on surface 108. Processing occurring downhole may be transmitted to surface 108 to be recorded, observed, and/or further analyzed. Additionally, information recorded on information handling system 138 that may be disposed downhole may be stored until BHA 130 may be brought to surface 108. In examples, information handling system 138 may communicate with BHA 130 through a communication line (not illustrated) disposed in (or on) drill string 116. In examples, wireless communication may be used to transmit information back and forth between information handling system 138 and BHA 130. Information handling system 138 may transmit information to BHA 130 and may receive as well as process information recorded by BHA 130. In examples, a downhole information handling system (not illustrated) may include, without limitation, a microprocessor or other suitable circuitry, for estimating, receiving and processing signals from BHA 130. Downhole information handling system (not illustrated) may further include additional components, such as memory, input/output devices, interfaces, and the like. In examples, while not illustrated, BHA 130 may include one or more additional components, such as analog-to-digital converter, filter and amplifier, among others, that may be used to process the measurements of BHA 130 before they may be transmitted to surface 108. Alternatively, raw measurements from BHA 130 may be transmitted to surface 108.

Any suitable technique may be used for transmitting signals from BHA 130 to surface 108, including, but not limited to, wired pipe telemetry, mud-pulse telemetry, acoustic telemetry, and electromagnetic telemetry. While not illustrated, BHA 130 may include a telemetry subassembly that may transmit telemetry data to surface 108. At surface 108, pressure transducers (not shown) may convert the pressure signal into electrical signals for a digitizer (not illustrated). The digitizer may supply a digital form of the telemetry signals to information handling system 138 via a communication link 140, which may be a wired or wireless link. The telemetry data may be analyzed and processed by information handling system 138.

As illustrated, communication link 140 (which may be wired or wireless, for example) may be provided that may transmit data from BHA 130 to an information handling system 138 at surface 108. Information handling system 138 may include a personal computer 141, a video display 142, a keyboard 144 (i.e., other input devices.), and/or non-transitory computer-readable media 146 (e.g., optical disks, magnetic disks) that can store code representative of the methods described herein. In addition to, or in place of processing at surface 108, processing may occur downhole.

As discussed below, methods may be utilized by information handling system 138 to determine properties of subterranean formation 106. Information may be utilized to produce an image, which may be generated into a two or three-dimensional models of subterranean formation 106. These models may be used for well planning, (e.g., to design a desired path of wellbore 102). Additionally, they may be used for planning the placement of drilling systems within a prescribed area. This may allow for the most efficient drilling operations to reach a subsurface structure. During drilling operations, measurements taken within wellbore 102 may be used to adjust the geometry of wellbore 102 in real time to reach a geological target. Measurements collected from BHA 130 of the formation properties may be used to steer drilling system 100 toward a subterranean formation 106.

Figure 2:
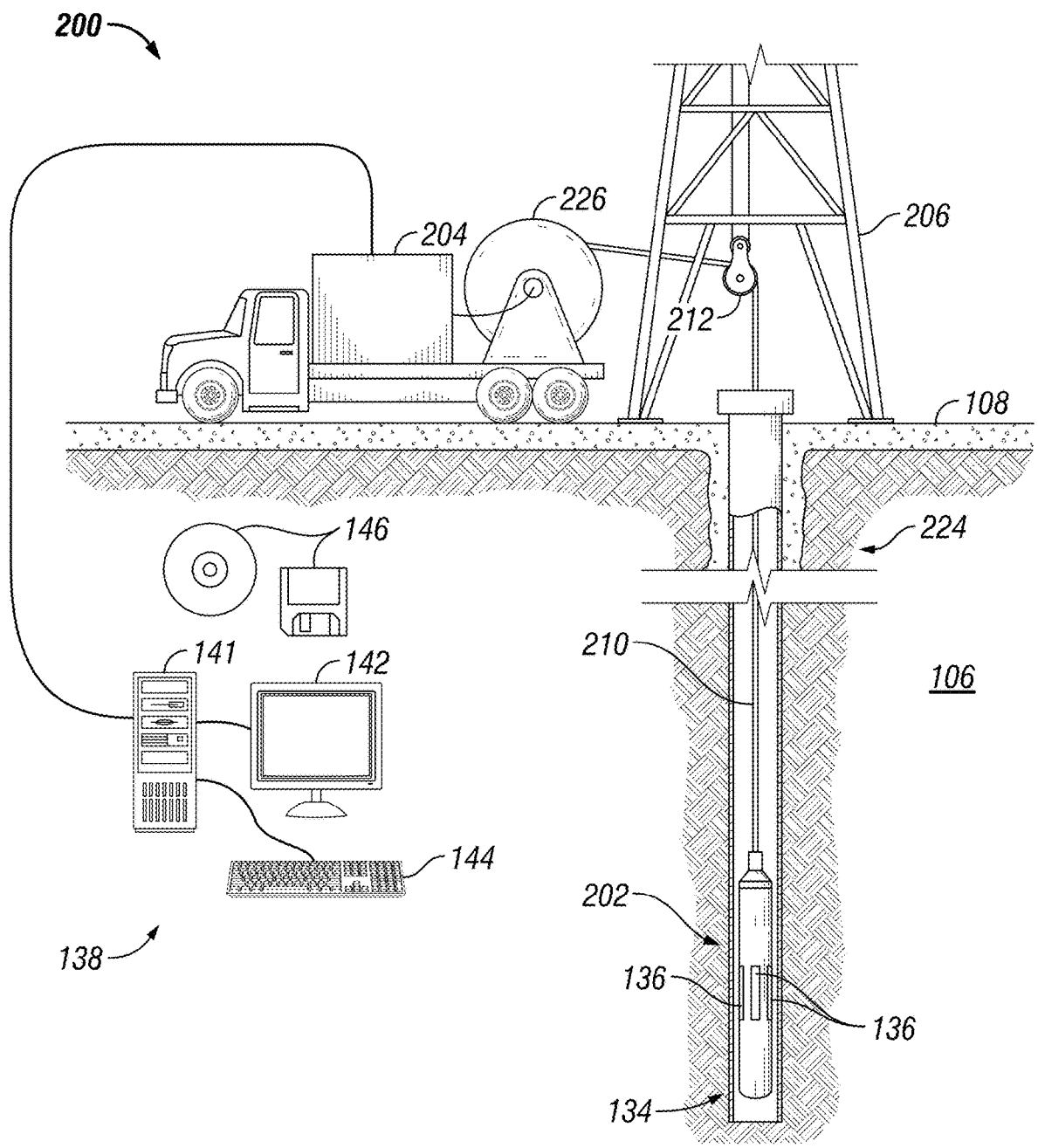
FIG. 2 illustrates an example of a well measurement system.

FIG. 2 illustrates a cross-sectional view of a well measurement system 200. As illustrated, well measurement system 200 may comprise downhole tool 202 attached a vehicle 204. In examples, it should be noted that downhole tool 202 may not be attached to a vehicle 204. Downhole tool 202 may be supported by rig 206 at surface 108. Downhole tool 202 may be tethered to vehicle 204 through conveyance 210. Conveyance 210 may be disposed around one or more sheave wheels 212 to vehicle 204. Conveyance 210 may include any suitable means for providing mechanical conveyance for downhole tool 202, including, but not limited to, wireline, slickline, coiled tubing, pipe, drill pipe, downhole tractor, or the like. In some embodiments, conveyance 210 may provide mechanical suspension, as well as electrical and/or optical connectivity, for downhole tool 202. Conveyance 210 may comprise, in some instances, a plurality of electrical conductors and/or a plurality of optical conductors extending from vehicle 204, which may provide power and telemetry. In examples, an optical conductor may utilize a battery and/or a photo conductor to harvest optical power transmitted from surface 108. Conveyance 210 may comprise an inner core of seven electrical conductors covered by an insulating wrap. An inner and outer steel armor sheath may be wrapped in a helix in opposite directions around the conductors. The electrical and/or optical conductors may be used for communicating power and telemetry between vehicle 204 and downhole tool 202. Information from downhole tool 202 may be gathered and/or processed by information handling system 138. For example, signals recorded by receiver 148 may be stored on memory and then processed by downhole tool 202.

The processing may be performed real-time during data acquisition or after recovery of downhole tool 202. Processing may alternatively occur downhole or may occur both downhole and at surface. In some embodiments, signals recorded by downhole tool 202 may be conducted to information handling system 138 by way of conveyance 210. Information handling system 138 may process the signals, and the information contained therein may be displayed for an operator to observe and stored for future processing and reference. Information handling system 138 may also contain an apparatus for supplying control signals and power to downhole tool 202.

Systems and methods of the present disclosure may be implemented, at least in part, with information handling system 138. While shown at surface 108, information handling system 138 may also be located at another location, such as remote from wellbore 102. Information handling system 138 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 138 may be a personal computer 141, a network storage device, or any other suitable device and may vary in size, shape, performance, functionality, and price. Information handling system 138 may include random access memory (RAM), one or more processing resources such as a central processing unit (CPU) or hardware or software control logic, ROM, and/or other types of nonvolatile memory. Additional components of the information handling system 138 may include one or more disk drives, one or more network ports for communication with external devices as well as various input and output (I/O) devices, such as a keyboard 144, a mouse, and a video display 142. Information handling system 138 may also include one or more buses operable to transmit communications between the various hardware components. Furthermore, video display 142 may provide an image to a user based on activities performed by personal computer 141. For example, producing images of geological structures created from recorded signals. By way of example, video display unit may produce a plot of depth versus the two cross-axial components of the gravitational field and versus the axial component in borehole coordinates. The same plot may be produced in coordinates fixed to the Earth, such as coordinates directed to the North, East and directly downhole (Vertical) from the point of entry to the borehole. A plot of overall (average) density versus depth in borehole or vertical coordinates may also be provided. A plot of density versus distance and direction from the borehole versus vertical depth may be provided. It should be understood that many other types of plots are possible when the actual position of the measurement point in North, East and Vertical coordinates is taken into account. Additionally, hard copies of the plots may be produced in paper logs for further use.

Alternatively, systems and methods of the present disclosure may be implemented, at least in part, with non-transitory computer-readable media 146. Non-transitory computer-readable media 146 may include any instrumentality or aggregation of instrumentalities that may retain data and/or instructions for a period of time. Non-transitory computer-readable media 146 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In examples, rig 206 includes a load cell (not shown) which may determine the amount of pull on conveyance 210 at the surface of wellbore 102. Information handling system 138 may comprise a safety valve (not illustrated) which controls the hydraulic pressure that drives drum 226 on vehicle 204 which may reel up and/or release conveyance 210 which may move downhole tool 202 up and/or down wellbore 102. The safety valve may be adjusted to a pressure such that drum 226 may only impart a small amount of tension to conveyance 210 over and above the tension necessary to retrieve conveyance 210 and/or downhole tool 202 from wellbore 102. The safety valve is typically set a few hundred pounds above the amount of desired safe pull on conveyance 210 such that once that limit is exceeded, further pull on conveyance 210 may be prevented.

As illustrated in FIG. 2, downhole tool 202 may include measurement assembly 134. It should be noted that measurement assembly 134 may make up at least a part of downhole tool 202. Without limitation, any number of different measurement assemblies, communication assemblies, battery assemblies, and/or the like may form downhole tool 202 with measurement assembly 134. Additionally, measurement assembly 134 may form downhole tool 202 itself. In examples, measurement assembly 134 may comprise at least one transducer 136, which may be disposed at the surface of measurement assembly 134. Without limitation, transducer 136 may also be disposed within measurement assembly 134. Without limitation, there may be four transducers 136 that may be disposed ninety degrees from each other. However, it should be noted that there may be any number of transducers 136 disposed along BHA 130 at any degree from each other. Additionally, transducers 136 may be aligned on top of each other and spaced about the axis of BHA 130. Transducers 136 may function and operate to generate an acoustic pressure pulse in the wellbore fluid. In examples, measurement assembly 134 may also comprise at least one receiver 148, which may be disposed at the surface of measurement assembly 134 and/or receiver 148 may also be disposed within measurement assembly 134. Without limitation, there may be four receivers 148 that may be disposed ninety degrees from each other. However, it should be noted that there may be any number of receivers 148 disposed along BHA 130 at any degree from each other. Additionally, receivers 148 may be aligned on top of each other and spaced about the axis of BHA 130. Receiver 148 may function and operate to receive an acoustic pressure pulse which may be referred to as an acoustic wave that travels through wellbore fluids.

Figure 3:
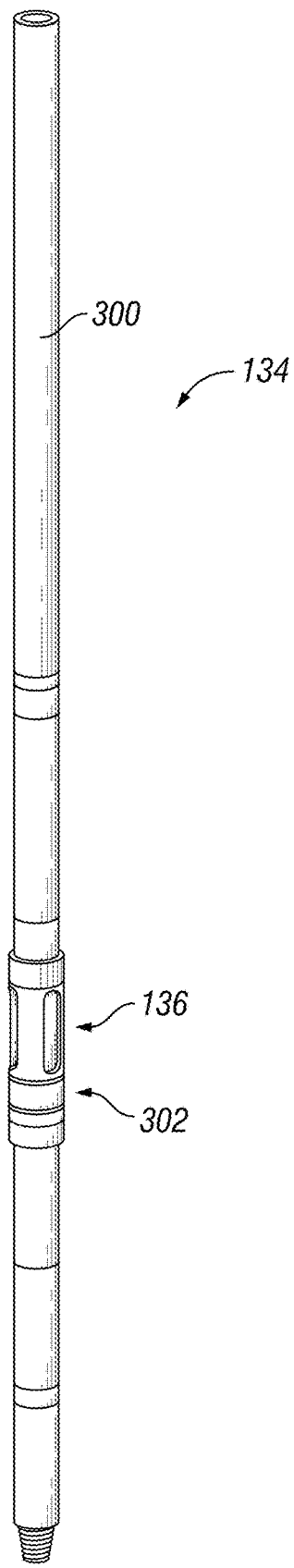
FIG. 3 illustrates an example of a measurement assembly.

FIG. 3 illustrates an expanded view of measurement assembly 134. As illustrated, measurement assembly 134 may comprise at least one battery section 300 and at least on instrument section 302. Battery section 300 may operate and function to enclose and/or protect at least one battery that may be disposed in battery section 300. Without limitation, battery section 300 may also operate and function to power measurement assembly 134. Specifically, battery section 300 may power at least one transducer 136 and at least one receiver 148, which may be disposed at any end of battery section 300 in instrument section 302.

Instrument section 302 may house at least one transducer 136 and at least one receiver 148. As describe above, transducer 136 may operate and function and operate to generate a pressure pulse that travels through wellbore fluids. The pressure pulse may have a frequency range from 10 Hz~20 kHz. It should be noted that the pulse signal may be emitted with different frequency content. In examples, transducers 136 may be referred to as a transmitter, which generates a pressure pulse, travelling in the wellbore fluids to interact with wellbore 102 (e.g., referring to FIG. 1). In examples, a pressure pulse may be referred to as an acoustic wave and/or acoustic waves, as seen below. During operations a pressure pulse may reflect of any number of surfaces in wellbore 102. The reflected acoustic waves may be received by a receiver 148 or an array of receivers 148 a few inches to a few feet away from transducer 136.

Figure 4:
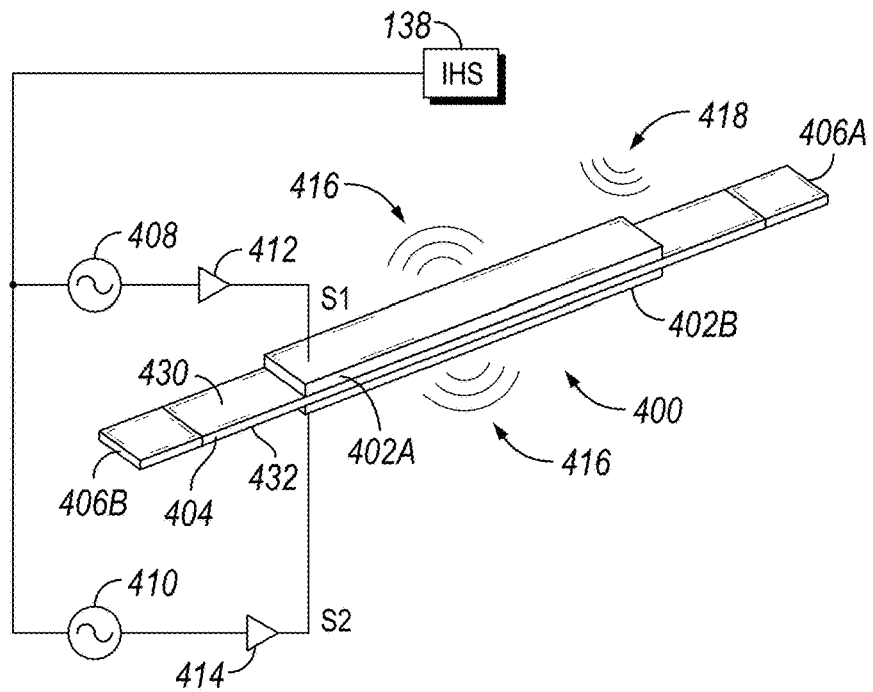
FIG. 4 illustrates a bender bar assembly.

Pressure pulse may be created by bender bar 400, as illustrated in FIG. 4. Bender bar 400 operates and functions as a piece of transducer 136 (e.g., referring to FIG. 1) to create acoustic energy. Bender bar 400 is typically immersed in oil and contained within in a housing, discussed in detail below. The housing separates the oil from wellbore fluids in wellbore 102. Bender bar 400 includes an assembly of two piezoelectric layers 402a and 402b, metallic substrate 404 having no piezoelectric properties, two fixed ends 406a and 406b, voltage or current sources 408 and 410, and amplifiers 412 and 414. Piezoelectric layer 402a and piezoelectric layers 402b are bonded to metallic substrate 404 with epoxy, resin, or any known bonding technique. As illustrated, piezoelectric layer 402a is bonded to a first surface 430 of bender bar 400 and piezoelectric layer 402b is bonded to a second surface 432 of bender bar 400. Metallic substate 404 is mounted to fixed ends 406a and 406b so that each end of the metallic substrate 404 is always held in position. Voltage or current sources 408 and 410 are controlled by information handling system 138 via hard or wireless implementation and are connected to amplifiers 412 and 414. Amplifiers 412 and 414 provide signals S1 and S2 in the form of electrical energy to piezoelectric layers 402a and 402b respectively. The electrical energy provided by S1 and S2 is converted into mechanical energy in each piezoelectric layer 400a and 400b. In examples, a single signal may be generated by a single source, such as a single voltage source or single current source. As noted above, the amplifier or a single amplifier may provide electrical energy to piezoelectric layers 402a and 402b. Subsequently, piezoelectric layers 402a and 402b may induce mechanical energy on metallic substate 404 based on the frequencies and amplitudes of S1 and S2. Fixed ends 404a and 404b on metallic substrate 404 may allow mechanical energy induced from piezoelectric layers 400a and 400b to oscillate. Oscillation of metallic substrate 404 allows for the transmission of output acoustic waves 416 within fluid that bender bar 400 may be immersed in.

Output pressure pulses 416 propagate in both directions from bender bar 400 as illustrated in FIG. 4. However, a large portion of output pressure pulses 416 may not refract through wellbore 102 (e.g., referring to FIG. 1), as to be discussed in detail below. Output pressure pulses 416 which do refract through wellbore 102 enter subterranean formation 106 (e.g., referring to FIG. 1). As they travel through subterranean formation 106, output pressure pulses 416 may attenuate and become encoded with formation properties of subterranean formation 106. After some attenuation, output pressure pulses 416 reflect in subterranean formation 106 forming secondary pressure pulse 418, which may be sensed, measured, and/or recorded by receivers 148 in the downhole tool 202 (e.g., referring to FIGS. 1 and 2).

Figure 5A:
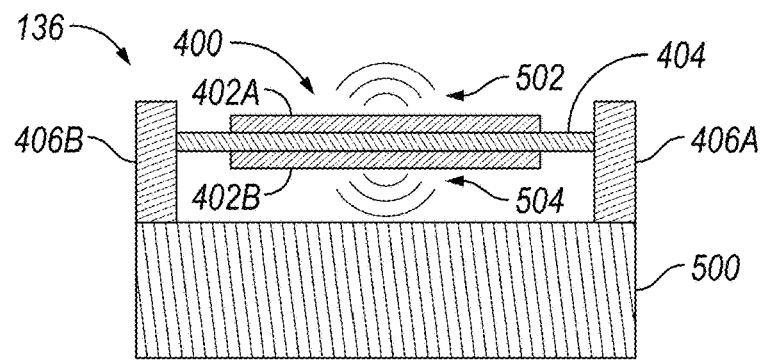
FIG. 5A illustrates a cross sectional assembly of a bender bar.

FIG. 5A illustrates a cross sectional view of transducer 136 with bender bar 400. In the cross-sectional view of FIG. 5A, further illustrated are two piezoelectric layers 402a and 402b, metallic substrate 404 having no piezoelectric properties, two fixed ends 406a and 406b, and base 500. Base 500 is attached at bender bar 400 via fixed ends 406a and 406b to form transducer 136. Base 500 may be mounted to measurement assembly 134 (e.g., referring to FIG. 1 and FIG. 2) which fixes transducer 136 to measurement assembly 134. As previously described, bender bar 400 is immersed within oil 514 in a housing 512. Housing 512 is tightly sealed and formed of downhole metals similar to measurement assembly 134 (e.g., referring to FIG. 3). Housing 512 separates bender bar 400 from fluids in wellbore 102 (e.g., referring to FIG. 1) such that bender bar 400 is fully enveloped within oil 514. Effectively, housing 512 may be formed by base 500, bender bar 400, and between fixed ends 406a and 406b. The space created within housing 512 may be filled oil 514 that is enclosed by a housing 512

During operations, bender bar 400 may emit pressure pulses into the oil 514 and into fluid within wellbore 102. FIG. 5A shows transducer 136, producing output pressure pulses 416 (e.g., referring to FIG. 4) as investigation pressure pulses 502 that move in the direction of investigation and rear pressure pulses 504. At low frequencies, rear pressure pulses 504 have a larger wavelength in comparison to the thickness of base 500 and measurement assembly 134 (e.g., referring to FIG. 1 and FIG. 2). Thus, rear pressure pulses 504 may pass through base 500 and measurement assembly 134 (e.g., referring to FIG. 1 and FIG. 2). Hence, at low frequency, the rear pressure pulses 504 are not utilized to excite subterranean formation 106 in the direction of investigation which is in front of measurement assembly 134 (e.g., referring to FIGS. 1 and 2).

Figure 5B:
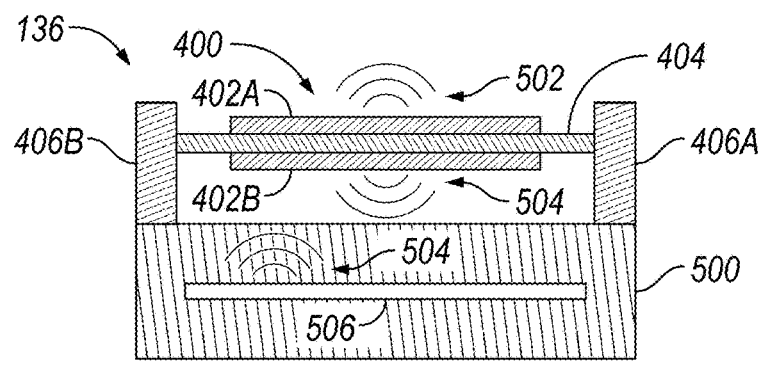
FIG. 5B illustrates a cross sectional assembly of a bender bar with a compartment.

FIG. 5B illustrates a cross sectional view of transducer 136 with a compartment 506. Compartment 506 may be utilized to increase the amplitude of investigation pressure pulses 502 at lower frequencies. In examples, compartment 506 may be filled with any number and type of gasses and liquids as compartment 506 is formed in base 500. Additionally, compartment 506 may include a vacuum formed in base 500. A vacuum is defined as any pressure below standard atmospheric pressure. For example, a vacuum is less than atmospheric pressure in that it has a pressure of at least 20% less than atmospheric. Without limitation, compartment 506 may be formed by any suitable methods. Suitable methods may include but are not limited to removing material from base 500 via any machine fabrication then welding to seal, forming through casting, forming through a die, and/or the like. Thus, compartment 506 is not located between bender bar 400 and base 500 but rather within base 500. As previously described, oil 514 fully envelopes bender 400 between base 500, housing unit 512, and fixed ends 406a and 406b. Compartment 506 may have a thickness 508 that is dependent upon the size of base 500, however without limitation may measure from about 1 micrometer to about 0.3 meter. Coordinate system 510 may be define the S—sagittal and L—longitudinal directions to define the location of components within transducer 136, such as compartment 506. Compartment 506 may be located at any location in the S—sagittal or L—longitudinal direction within base 500. Typically, the acoustic impedance of compartment 506 may be significantly lower than the acoustic impedance of oil 514 which is approximately 1 MRayls and downhole metals which range from 30-50 MRayls. Thus, any known gas that may fill compartment 506 may have a significantly smaller acoustic impedance than oil 514 and downhole metals. Additionally, a vacuum is suitable to fill the enclosed space of compartment 506. In the effect of filling compartment 506 with a vacuum or gar, rear pressure pulse 504 may undergo near total reflection once in contact compartment 506. This is evident when compartment 506 has a significantly lower acoustic impedance than oil 514 or downhole metals. Upon near total reflection, rear pressure pulse 504 may be superimposed onto investigation pressure pulses 502. Utilization of compartment 506 with a low acoustic impedance may yield an increased amplitude of investigation pressure pulses 502 at lower frequencies.

Figure 6A:
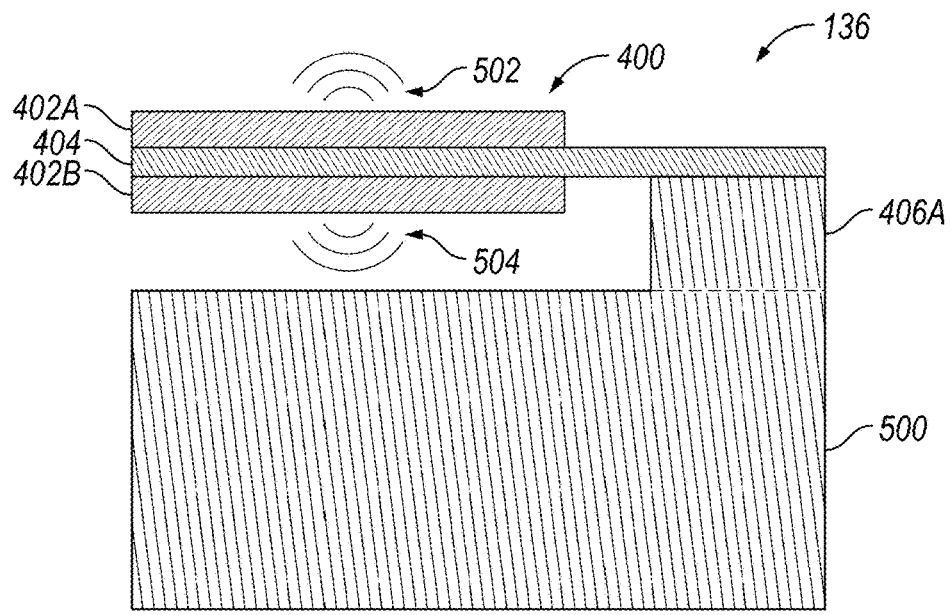
FIGS. 6A and 6B illustrate the apparatus and a simulation with no compartment implemented.

FIGS. 6A-8B utilize simulated data to show the improvement over current technology to increase amplitude at low frequencies from a transducer 136 (e.g., eferring to FIG. 1). FIG. 6A illustrates transducer 136 that may operate between 1-10 kHz without compartment 506. In this configuration there are two piezoelectric layers 402a and 402b, metallic substrate 404 having no piezoelectric properties, fixed end 406a, and base 500, which may be connected to measurement assembly 134 (e.g., referring to FIG. 1 and FIG. 2) as transducer 136. During operations, transducer 136 functions and operates to produce pressure pulses in the form of an investigation pressure pulses 502 and rear pressure pulses 504.

Figure 6B:
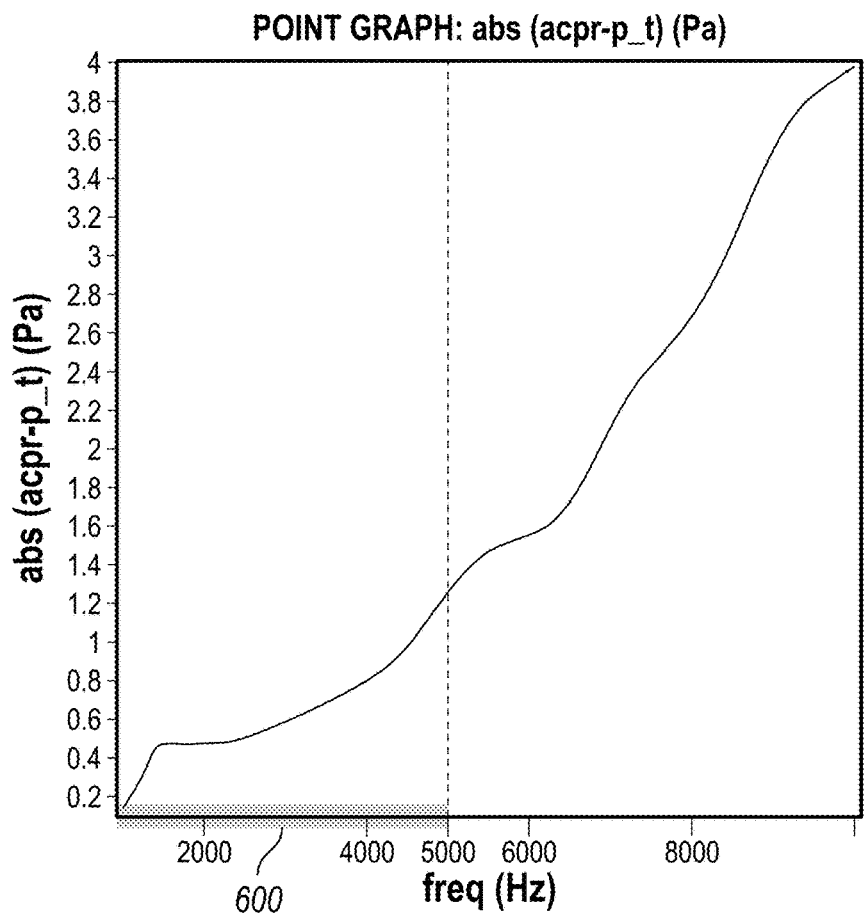

FIG. 6B is a graph of results from a simulation for transducer 136 depicted in FIG. 6A. The graph of FIG. 6B illustrates a plurality of acoustic wave measurements. Additionally, the graph represents lab date of acoustic wave measurements may be made about 0.1 meter (0.32 foot) away from bender bar 400 (e.g., referring to FIG. 4) in water and is depicted as the amplitude of acoustic waves on the Y-axis. The acoustic wave measurement is performed across a frequency bandwidth of 1-10 kHz as shown on the X-axis. As previously described, low frequency area of interest from 1-5 kHz may be represented as item 600 in FIG. 6B. The results of the acoustic wave measurement show less amplitude of acoustic waves measured at lower frequencies than at higher frequencies.

Figure 7A:
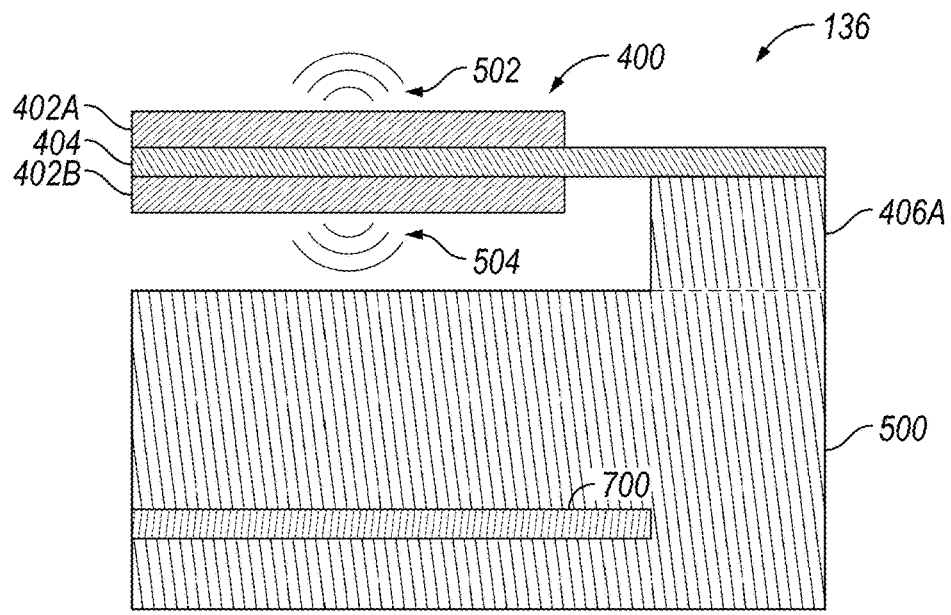
FIGS. 7A and 7B illustrate an apparatus and a simulation with an oil layer as the compartment.

FIG. 7A illustrates transducer 136 that may operate between 1-10 kHz with an oil 514 disposed within compartment 506. In this configuration there are two piezoelectric layers 402a and 402b, metallic substrate 404 having no piezoelectric properties, fixed end 406a, and base 500, which may be connected to measurement assembly 134 (e.g., referring to FIG. 1 and FIG. 2) as transducer 136. As illustrated, oil 514 may be disposed within compartment 506, as described above oil 514 has similar acoustic impedance to fluids, with the formation 106 and/or wellbore 102 (e.g., referring to FIGS. 1 and 2). During operations, transducer 136 functions and operates to produce pressure pulses in the form of an investigation pressure pulses 502 and rear pressure pulses 504.

Figure 7B:
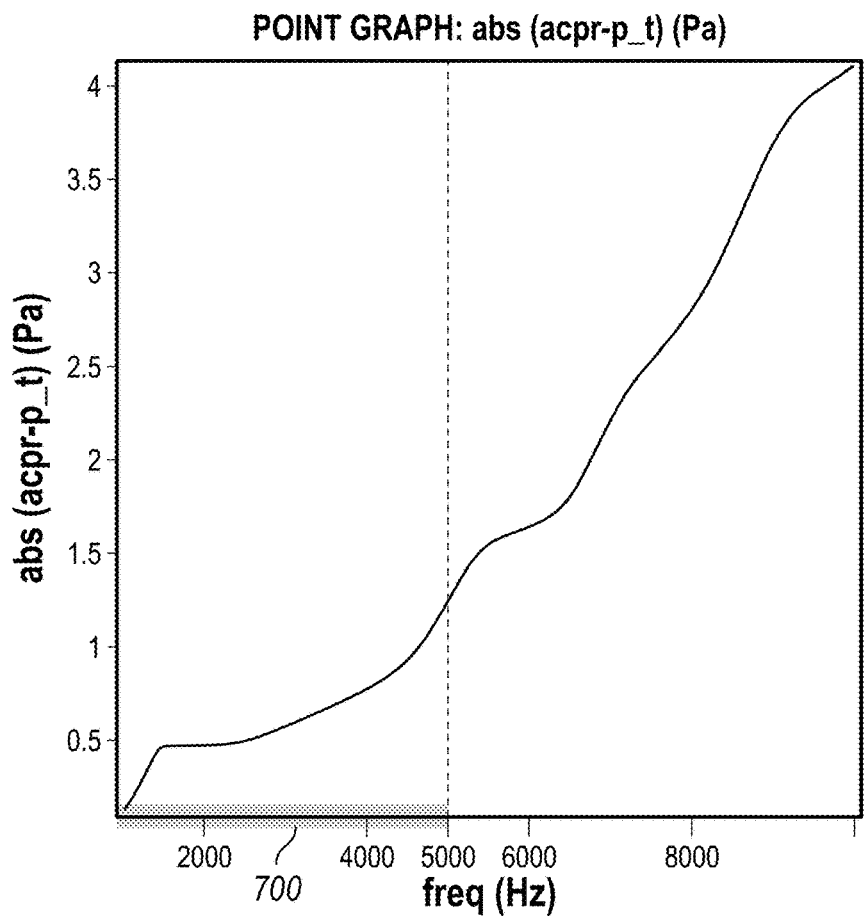

FIG. 7B is a graph of results from a simulation for transducer 136 depicted in FIG. 7A. The graph of FIG. 7B illustrates a plurality of acoustic wave measurements. Additionally, the graph represents lab date of acoustic wave measurements may be made 0.1 meter (0.32 foot) away from bender bar 400 in water and is depicted as the amplitude of acoustic waves on the Y-axis. The acoustic wave measurement is performed across a frequency bandwidth of 1-10 kHz as shown on the X-axis. As previously described, low frequency area of interest from 1-5 kHz may be represented as item 702 in FIG. 7B. The results of the acoustic wave measurement show less amplitude of acoustic waves measured at lower frequencies than at higher frequencies. Therefore, rear pressure pulses 504 (e.g., referring to FIGS. 5A and 5B) at lower frequencies do not reflect, but rather pass-through compartment 506 due to oil 514 (e.g., referring to FIG. 7A). The amplitude at lower frequencies may be increased using the systems and methods described above with compartment 506 (e.g., referring to FIGS. 5A and 5B).

Figure 8A:
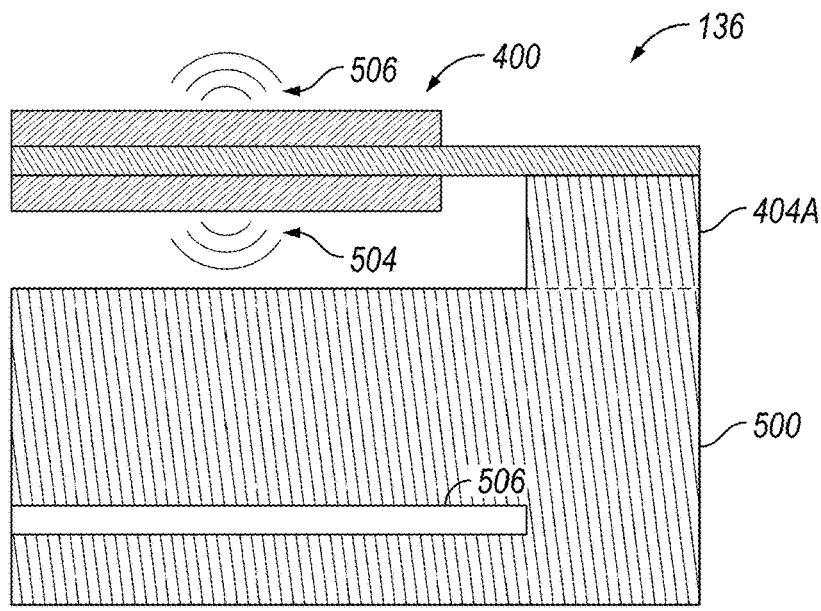
FIGS. 8A and 8B illustrate the apparatus and a simulation with an air layer as the compartment.

FIG. 8A illustrates transducer 136 that may operate between 1-10 kHz with compartment 506 filled with a gas or vacuum. In this configuration there are two piezoelectric layers 402a and 402b, metallic substrate 404 having no piezoelectric properties, fixed end 406a, and base 500, which may be connected to measurement assembly 134 (e.g., referring to FIG. 1 and FIG. 2) as transducer 136. During operations, transducer 136 functions and operates to produce pressure pulses in the form of an investigation pressure pulses 502 and rear pressure pulses 504.

Figure 8B:
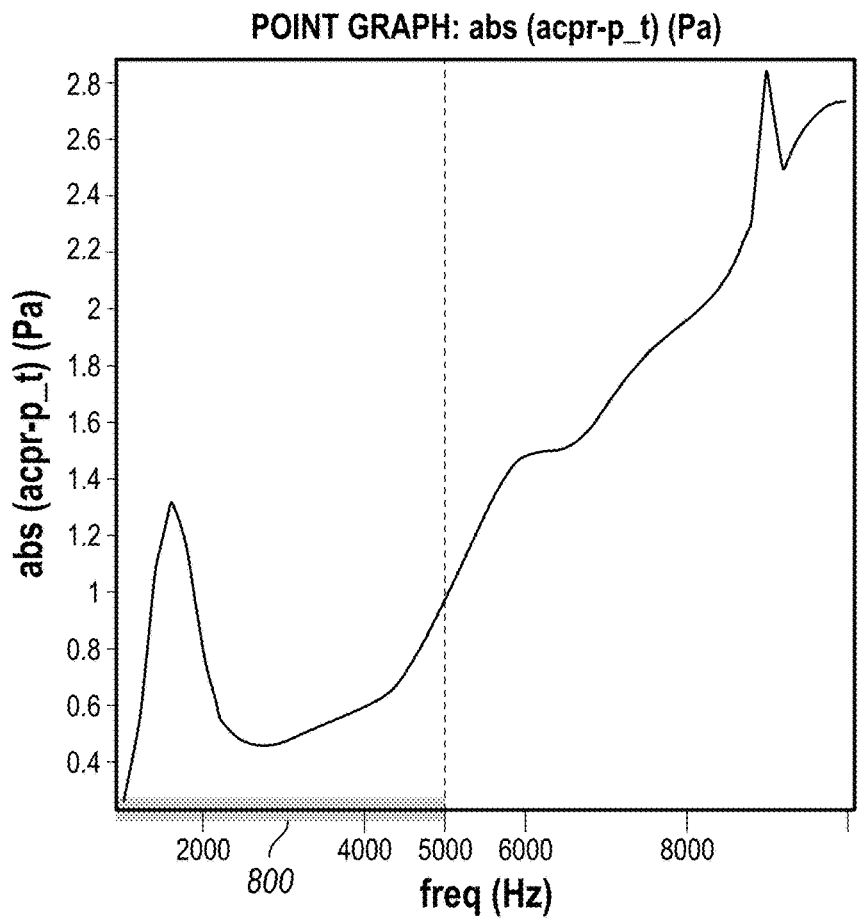

FIG. 8B is a graph of results from a simulation for transducer 136 depicted in FIG. 8A. The graph of FIG. 8B illustrates a plurality of acoustic wave measurements. Additionally, the graph represents lab date of acoustic wave measurements may be made 0.1 meter (0.32 foot) away from bender bar 400 in water and is depicted as the amplitude of acoustic waves on the Y-axis. The acoustic wave measurement is performed across a frequency bandwidth of 1-10 kHz as shown on the X-axis. As previously described, low frequency area of interest from 1-5 kHz may be represented as item 800 in FIG. 8B. Results show that the amplitude of acoustic waves is increased in comparison relative to FIGS. 6B and 7B. Specifically, from 1.5-3 kHz to be discussed in further detail below. These results illustrate that the rear pressure pulses 504 (e.g., referring to FIGS. 5A and 5B) at lower frequencies may experience near totally reflection after contacting compartment 506 filled with a gas or vacuum. As such, the amplitude of investigation pressure pulses 502 at lower frequencies has been increased as the rear pressure pulses 504 have superimposed onto investigation pressure pulses 502 that may be moving in the direction of investigation.

Figure 9A:
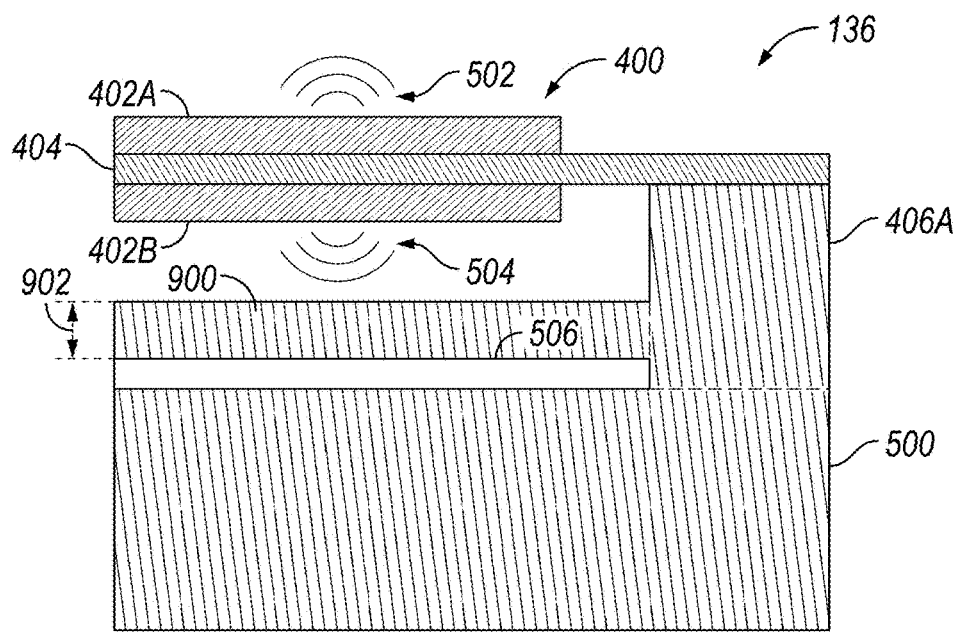
FIGS. 9A, 9B, and 9C illustrate an apparatus of simulation of implementing a metal beam.

FIG. 9A illustrates transducer 136 that may operate between 1-10 kHz with a metal beam 900. In this configuration there are two piezoelectric layers 402a and 402b, metallic substrate 404 having no piezoelectric properties, fixed end 406a, and base 500, which may be connected to measurement assembly 134 (e.g., referring to FIG. 1 and FIG. 2) as transducer 136. Metal beam 900 is used to increase amplitude of investigation pressure pulses 502 (e.g., referring to FIGS. 5A and 5B) at lower frequencies. Metal beam 900 may be any downhole metal. As illustrated in FIG. 9A, metal beam 900 is clamped via standard implementation to fixed ends 404a and 404b (e.g., referring to FIG. 4) and may be designed to have a thickness 902 of about 0.254 centimeters to about 0.762 centimeters (about 0.1 inch to about 0.3 inch). A thickness 902 of about 0.508 centimeters (about 0.2 inch) yields a resonant frequency within the low frequency area of interest 904, however the thickness 902 may be altered to change the resonate frequency.

Figure 9B:
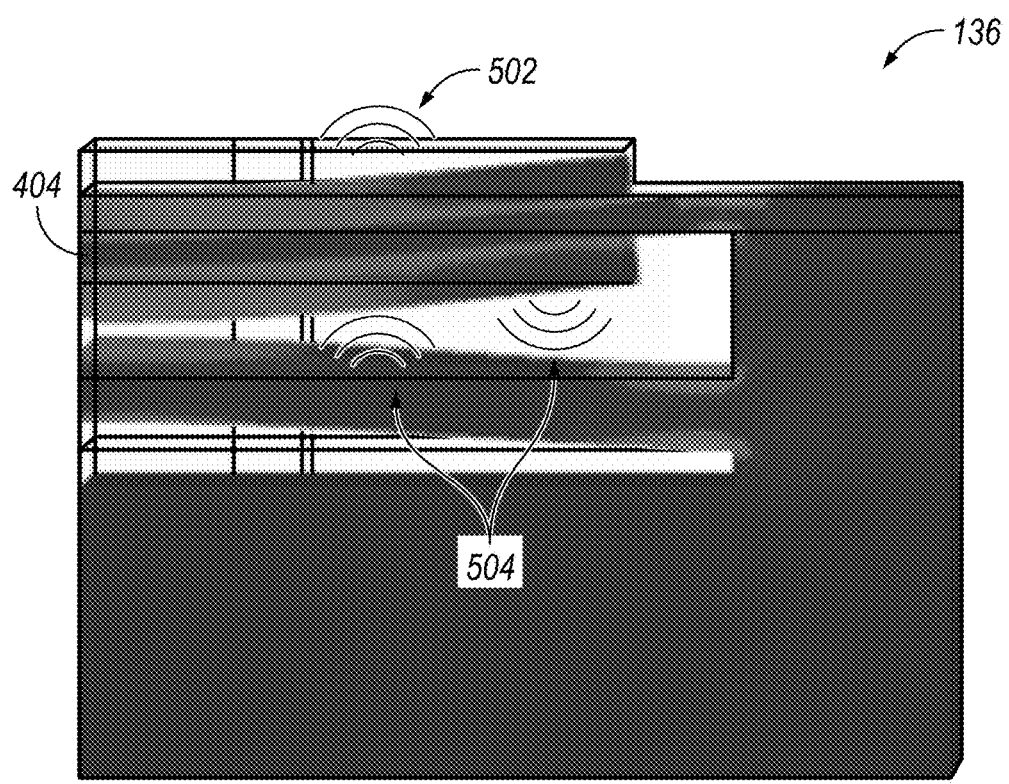

FIG. 9B illustrates operations of metal beam 900 while piezoelectric layers 402a and 402b are induced with electric energy producing mechanical energy and vibration of metal substrate 404 to form pressure pulses in the form of investigation pressure pulses 502 and rear pressure pulses 504. Subsequently, metal beam 900 may elastically strain and vibrate due to induction of rear waves 504. In effect, elastically strained metal beam 900 may reflect rear waves 504 to become superimposed onto investigation pressure pulses 502 yielding a greater transducer output at a specific resonance frequency dependent upon thickness 902.

Figure 9C:
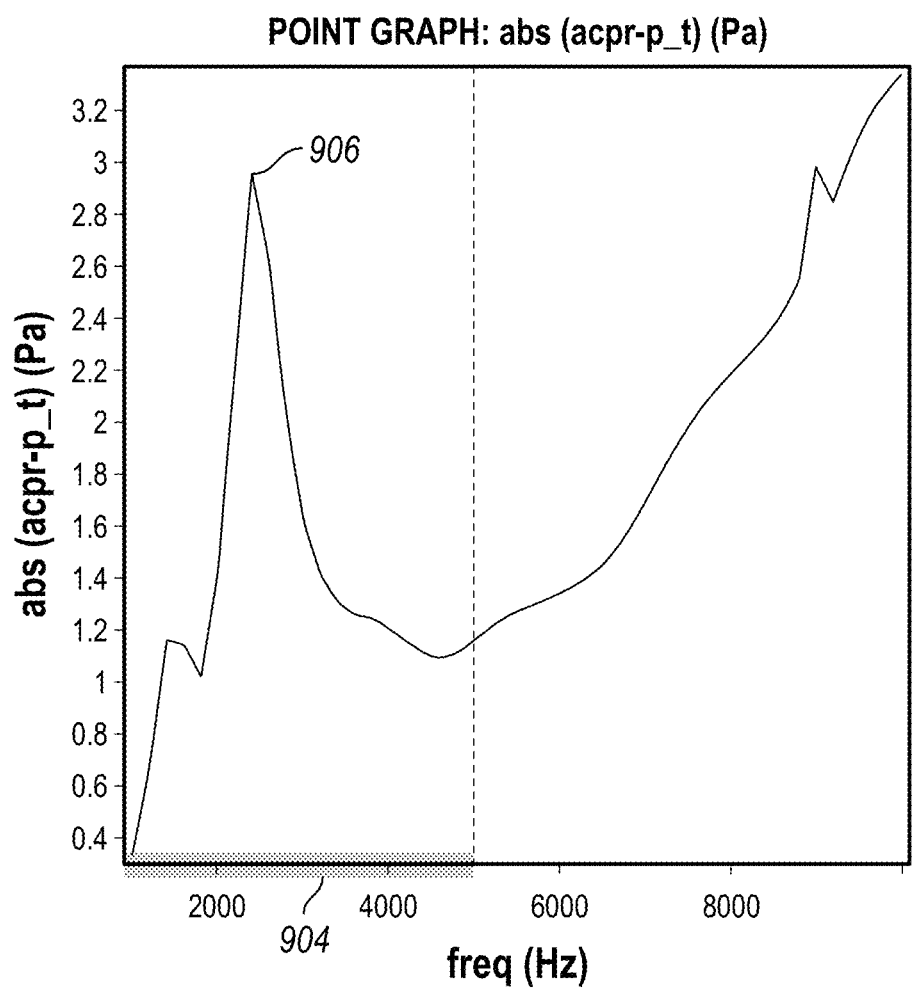

FIG. 9C is a graph of results from a simulation for transducer 136 depicted in FIG. 9A. Additionally, the graph represents lab date of acoustic wave measurements may be made 0.1 meter (0.32 foot) away from bender bar 400 in water and is depicted as the amplitude of acoustic waves on the Y-axis. The acoustic wave measurement is performed across a frequency bandwidth of 1-10 kHz as shown on the X-axis. As previously described, low frequency area of interest from 1-5 kHz may be represented as 904 in FIG. 9C. The results of the pressure output show a vast increase in the amplitude of acoustic waves with the implementation of metal beam 900 for the low frequency area of interest 904. Rear pressure pulses 504 at lower frequencies may have near complete reflection with the addition of metal beam 900. As such, the amplitude of investigation pressure pulses 502 at lower frequencies has been increased when a thickness 902 of 0.508 centimeter (0.2 inch) is selected. Further, peak acoustic wave amplitude 906 is correlated to the resonance frequency determined by thickness 902.

Figure 10A:
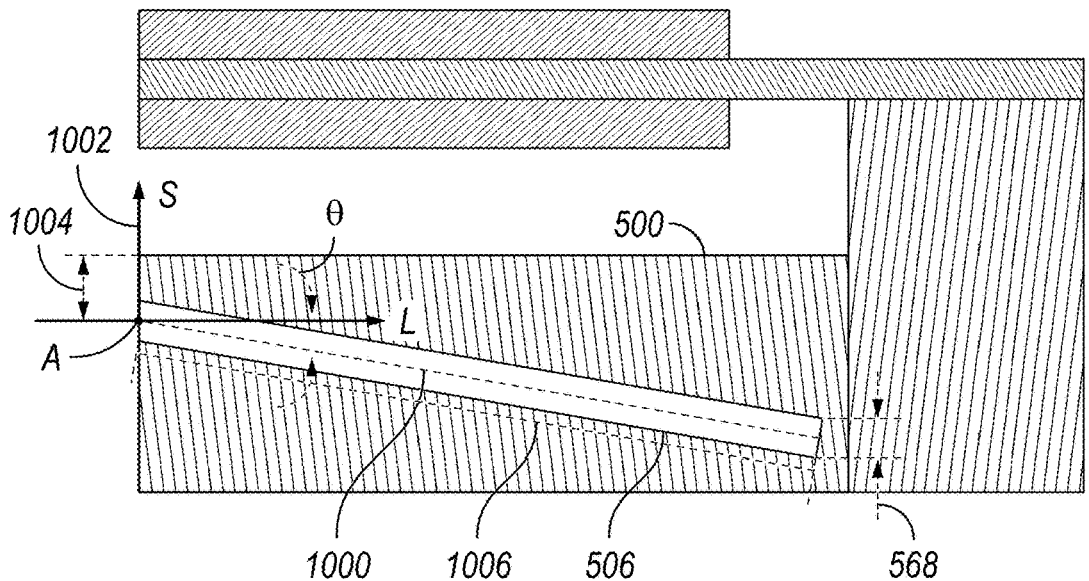
FIGS. 10A, 10B, 10C, and 10D illustrate alternative embodiments.

FIG. 10A illustrates an alternative embodiment of transducer 136 which may include compartment 506 with an angular displacement θ, thickness 508, and center line 1000 running parallel through the entirety of compartment 506. Located at one end of compartment 506 on center line 1000 is coordinate grid 1002. Point A is located and identifies the origin of coordinate grid 1002. The angular displacement between the positive L—longitudinal direction of coordinate grid 1002 and center line 1000 may be expressed as θ. Coordinate grid 1002 may also define the S—sagittal direction. Angular displacement θ may be expressed positively in a counterclockwise angular displacement from the positive L—longitudinal direction of coordinate grid 1002 or negatively in a clockwise angular displacement from the positive L—longitudinal direction of coordinate grid 1002. Point A may be displaced from the top of base 500 by a length 1004. Additionally, point A may be located on either end of compartment 506 on center line 1000. Compartment 506 has a length 1006 and thickness 508 as previously described. Angular displacement θ may directionality change reflected rear pressure pulses 504 (e.g., referring to FIG. 5A and FIG. 5B) to enter formation 106 (e.g., referring to FIG. 1) with a different angle than investigation pressure pulses 502 (e.g., referring to FIGS. 5A and 5B). Thus, illuminating a different part of formation 106 (e.g., referring to FIG. 1) than previously illuminated. Lengths 1006, 1004, and angular displacement θ may be altered to change the transducer output.

Figure 10B:
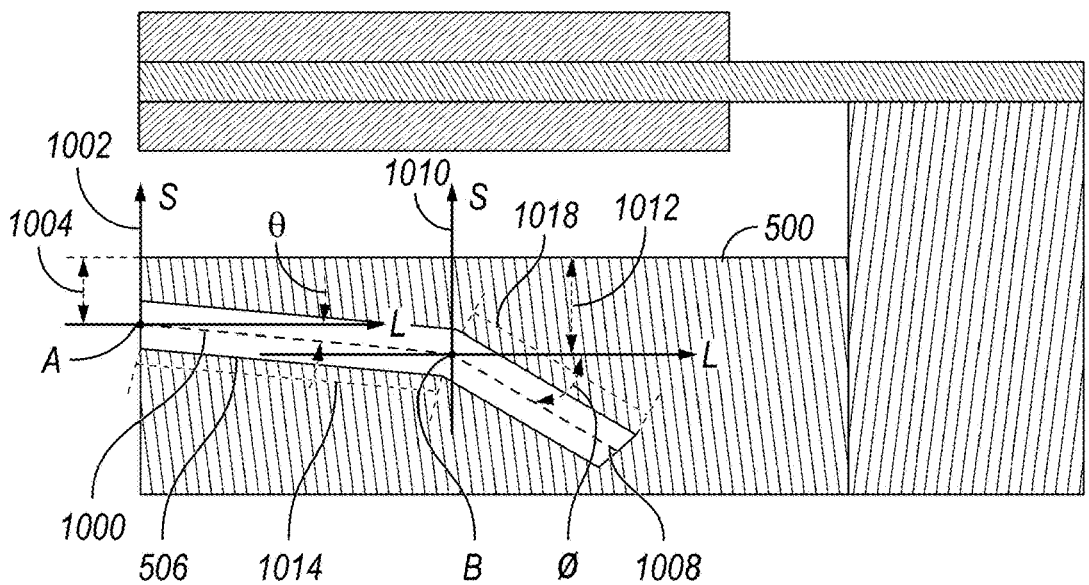

FIG. 10B illustrates an alternative embodiment of bender bar 400 which may include an angular displacement θ and joint angular displacement φ in compartment 506 with thickness 508. As previously described in FIG. 10A, the example depicted in FIG. 10B also incorporates point A, located at the origin of coordinate grid 1002. The angular displacement between the positive L—longitudinal direction of coordinate grid 1002 and center line 1000 may be expressed as θ. Angular displacement θ may be expressed positively in a counterclockwise angular displacement from the positive L—longitudinal direction of coordinate grid 1002 or negatively in a clockwise angular displacement from the positive L—longitudinal direction of coordinate grid 1002. However, joint B may also be introduced along the path of compartment 506. Similar to point A, joint B is located at the origin of coordinate grid 1010, but between center line 1000 and secondary center line 1008. Joint angular displacement φ is indicative of the angular difference between the positive L—longitudinal direction of coordinate grid 1010 and secondary center line 1008. In examples, joint angular displacement φ may be expressed positively in a counterclockwise angular displacement from the positive L—longitudinal direction of coordinate grid 1010 or negatively in a clockwise angular displacement from the positive L—longitudinal direction of coordinate grid 1010 which may also define the S—sagittal direction. Point A and joint B may be displaced from the top of base 500 by a length 1004 and 1012 respectively. The length from point A to joint B is defined as 1014, and the length from joint B to the opposite of compartment 506 is defined as 1016. The summation of length 1014 and length 1016 is equal to the length 1006 (e.g., referring to FIG. 10A). As previously stated, Angular displacement θ may directionality change reflected rear pressure pulses 504 (e.g., referring to FIGS. 5A and 5B) to enter subterranean formation 106 (e.g., referring to FIG. 1) with a different angle than investigation pressure pulses 502 (e.g., referring to FIGS. 5A and 5B). Thus, illuminating a different part of formation 106 that may not have been previously illuminated. In this implementation an additional joint angle has been added for multiple angles into subterranean formation 106. Any possible combination of lengths 1004, 1012, and 1014 (subsequently 1016) as well as θ and φ may be altered to change the direction, shape, orientation, and/or azimuthal plant of investigation pressure pulses 502. Angular displacement θ may not be utilized in an alternate embodiment resulting in a singular angular displacement at joint B. Additionally any number of joints with the same features as joint B may be employed along the path of compartment 506.

Figure 10C:
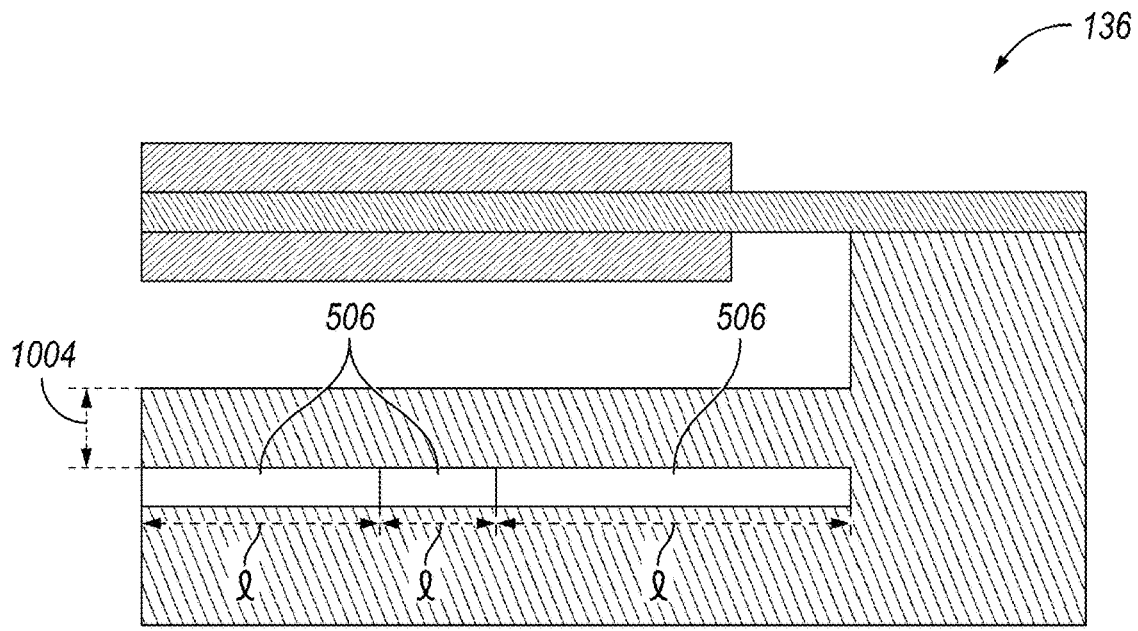

FIG. 10C illustrates an alternative example of transducer 136 which may employ multiple compartments 506 in parallel with thickness 508. Parallel compartments 506 may each have a length ℓ and may be displaced from the top of base 500 at a length 1004. Any number of compartments 506 may be alongside each other in parallel and length ℓ of each compartment 506 may be different or the same.

Figure 10D:
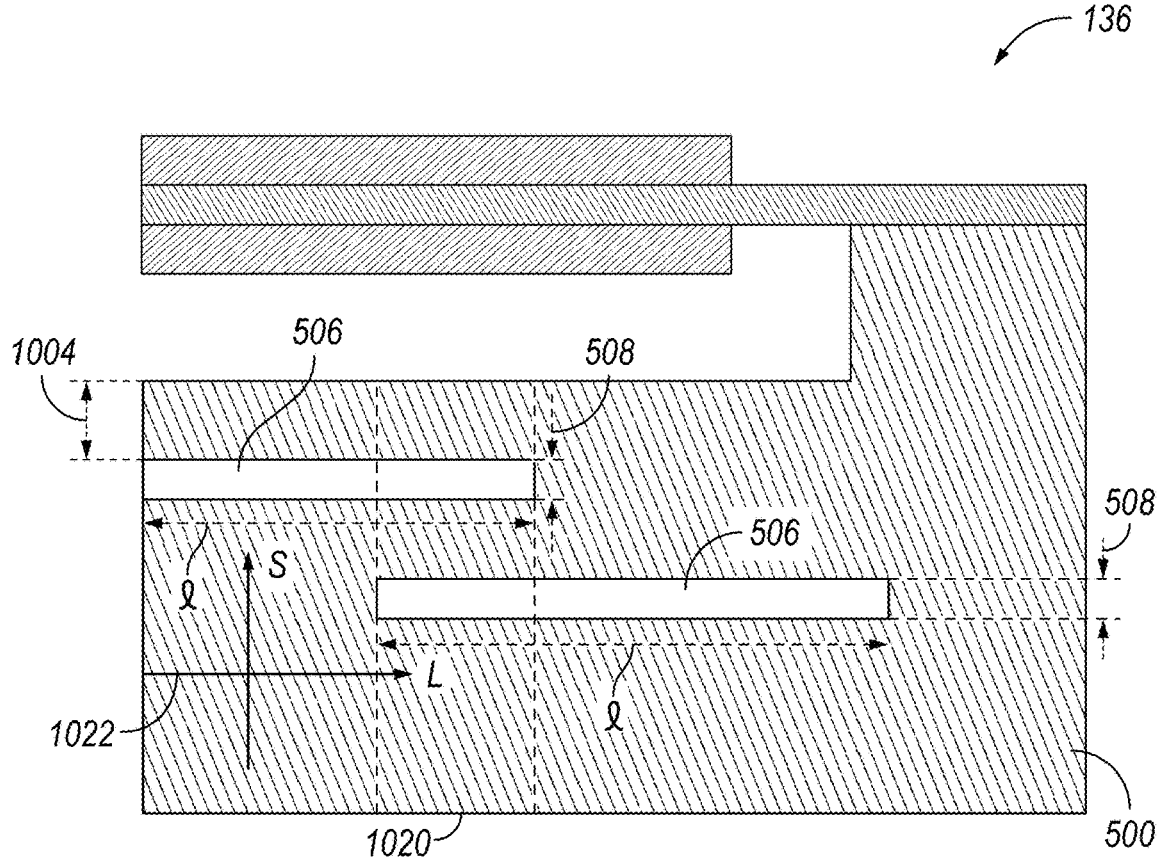

FIG. 10D illustrates an alternative embodiment of transducer 136 which may employ multiple compartments 506 in parallel with thickness 508 length ℓ. However, different from the previous embodiment, each compartment 506 is vertically displaced by a length 1018. In this example, vertical displacement is positive or negative displacement along the S—sagittal direction of coordinate system 1022. There may also be the presence of a horizontal overlap 1020 between vertically displaced compartment 506. Horizontal overlap 1020 may be measured as a presence of two compartments 506 along the L—longitudinal direction of coordinate system 1022. However, in certain embodiments no horizontal overlap may be present. Additionally, any number of vertically displaced compartments 506 formed of thickness 508 and length ℓ with or without horizontal overlap 1020 may be present. Any combination of singular or multiple angular displacements, multiple parallel, and vertically displaced configurations of compartments 506 may be employed to change the transducer output.

The implementation of compartment 506 within a transducer 136 (e.g., referring to FIGS. 5A and 5B) in a downhole environment improves current technology. Compartment 506 filled with gas, oil, and/or a vacuum within a transducer 136 may increases amplitude of investigation pressure pulses 502 at low frequency. Increasing amplitude of investigation pressure pulses 502 at low frequency is important because dipole and quadrupole waves measurements are needed to deduce shear velocity of the formation. Thus, large amplitudes of investigation pressure pulses 502 at low frequencies is paramount for extracting valuable information from the formation. The preceding description provides various embodiments of systems and methods of use which may contain different method steps and alternative combinations of components.

Statement 1. A transducer may include a bender bar, wherein the bender bar may include a first piezoelectric layer disposed on a first surface of the bender bar, a second piezoelectric layer disposed on a second surface of the bender bar, and a metallic substrate disposed between the first piezoelectric layer and the second piezoelectric layer. The transducer may further include a base having a compartment disposed therein, a first fixed end is attached to the bender bar and connects the bender bar to a base, a second fixed end opposite the first fixed end that attaches the bender bar to the base, and a compartment disposed within the base.

Statement 2. The transducer of statement 1, further comprising a metal beam disposed above the compartment within the base.

Statement 3. The transducer of statement 2, wherein the metal beam has a thickness of 0.1 to 0.3 inches.

Statement 4. The transducer of statement 1, wherein the compartment is filled with a gas or a vacuum.

Statement 5. The transducer of statement 1, further comprising a second compartment in the base.

Statement 6. The transducer of statement 5, wherein the second compartment is about parallel to the first compartment within the base.

Statement 7. The transducer of statement 5, wherein the second compartment is displaced along a sagittal direction within the base from the first compartment.

Statement 8. The transducer of statement 5, wherein the second compartment is overlapped along the longitudinal direction with the first compai hnent.

Statement 9. The transducer of statement 1, wherein the compartment is angled at a first end of the compartment or at a second end of the compartment.

Statement 10. The transducer of statement 1, wherein the compartment comprises at least one joint between the first end of the compartment and the second end of the compartment.

Statement 11. A method may include disposing a transducer downhole on a measurement assembly, wherein the transducer comprises a bender bar. The bender bar may include a first piezoelectric layer disposed on a first surface of the bender bar, a second piezoelectric layer disposed on a second surface of the bender bar, and a metallic substrate disposed between the first piezoelectric layer and the second piezoelectric layer. The transducer may further include a base having a compartment disposed therein, a first fixed end is attached to the bender bar and connects the bender bar to a base, a second fixed end opposite the first fixed end that attaches the bender bar to the base, and a compartment disposed within the base. The method may further comprise electrifying the first piezoelectric layer and the second piezoelectric layer to create one or more acoustic waves that include a plurality of front acoustic waves and a plurality of rear acoustic waves, wherein the plurality of rear acoustic waves reflect off the compartment and merge with the plurality of front acoustic waves to increase an amplitude of at least one of the plurality of front acoustic waves.

Statement 12: The method of statement 11, wherein the transducer further comprising a metal beam disposed above the compartment within the base.

Statement 13: The method of statement 12, wherein the metal beam is configured to further amplify the amplitude of at least one of the plurality of front acoustic waves by reflecting one or more of the plurality of rear acoustic waves.

Statement 14: The method of statement 11, wherein the compartment is filled with a gas or a vacuum.

Statement 15: The method of statement 11, further comprising a second compartment within the base.

Statement 16: The method of statement 15, wherein the second compartment is about parallel to the first compartment within the base.

Statement 17: The method of statement 15, wherein the second compartment is displaced along the sagittal direction within the base from the first compartment.

Statement 18: The method of statement 15, wherein the second compartment is overlapped along the longitudinal direction with the first compartment.

Statement 19: The method of statement 11, wherein the compartment is angled at a first end of the compartment or at a second end of the compartment.

Statement 20: The method of statement 19, wherein the compartment comprises at least one joint between the first end of the compartment and the second end of the compartment.

It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A transducer comprising:
   a bender bar comprising:
   a first piezoelectric layer disposed on a first surface of the bender bar;
   a second piezoelectric layer disposed on a second surface of the bender bar; and
   a metallic, substrate disposed between the first piezoelectric layer and the second piezoelectric layer;
   a base;
   a compartment disposed in the base,
   wherein the compartment is enclosed within the base, and
   wherein the compartment comprises a vacuum or a gas;
   a first fixed end attached to the bender bar and the base; and
   a second fixed end, opposite the first fixed end, attached to the bender bar and the base.

2. The transducer of claim 1, further comprising a metal beam disposed above the compartment within the base.

3. The transducer of claim 2, wherein the metal beam has a thickness of 0.1 to 0.3 inches.

4. The transducer of claim 1, further comprising a second compartment in the base.

5. The transducer of claim 4, wherein the second compartment is about parallel to the compartment within the base.

6. The transducer of claim 4, wherein the second compartment is displaced along a sagittal direction within the base from the compartment.

7. The transducer of claim 4, wherein the second compartment is overlapped along a longitudinal direction with the compartment.

8. The transducer of claim 1, wherein the compartment is angled at a first end of the compartment or at a second end of the compartment.

9. The transducer of claim 8, wherein the compartment comprises at least one joint between the first end of the compartment and the second end of the compartment.

10. The transducer of claim 1, wherein the metallic substrate is mounted to a fixed end attached to the base.

11. A method comprising:
    disposing a transducer downhole on a measurement assembly, wherein the transducer comprises:
    a bender bar comprising:
    a first piezoelectric layer disposed on a first surface of the bender bar;
    a second piezoelectric layer disposed on a second surface of the bender bar; and
    a metallic substrate disposed between the first piezoelectric layer and the second piezoelectric layer;
    a base;
    a compartment disposed in the base,
    wherein the compartment is enclosed within the base, and
    wherein the compartment comprises a vacuum or a gas;
    a first fixed end attached to the bender bar and the base; and
    a second fixed end, opposite the first fixed end, attached to the bender bar and the base; and
    electrifying the first piezoelectric layer and the second piezoelectric layer to create one or more pressure pulses that include a plurality of investigation pressure pulses and a plurality of rear pressure pulses, wherein the plurality of rear pressure pulses reflect off the compartment and merge with the plurality of investigation pressure pulses to increase an amplitude of at least one of the plurality of investigation pressure pulses.

12. The method of claim 11, wherein the transducer further comprises a metal beam disposed above the compartment within the base.

13. The method of claim 12, wherein the metal beam is configured to further amplify the amplitude of at least one of the plurality of investigation pressure pulses by reflecting one or more of the plurality of rear pressure pulses.

14. The method of claim 11, further comprising a second compartment in the base.

15. The method of claim 14, wherein the second compartment is about parallel to the compartment within the base.

16. The method of claim 14, wherein the second compartment is displaced along a sagittal direction within the base from the compartment.

17. The method of claim 14, wherein the second compartment is overlapped along a longitudinal direction with the compartment.

18. The method of claim 11, wherein the compartment is angled at a first end of the compartment or at a second end of the compartment.

19. The method of claim 18, wherein the compartment comprises at least one joint between the first end of the compartment and the second end of the compartment.

20. The method of claim 11, wherein the metallic substrate is mounted to a fixed end attached to the base.

* * * * *